United States Patent [19]

Didier et al.

[11] Patent Number: 4,968,774

[45] Date of Patent: Nov. 6, 1990

[54] AMINO-PLASTIC RESINS INTENDED FOR THE IMPROVEMENT OF CELLULOSED FIBRES AND THEIR APPLICATION

[75] Inventors: Wilhelm Didier, Issy Les Moulineaux; Loison Sylvie, Nanterre; Blanc Alain, Paris, all of France

[73] Assignee: Societe Francaise Hoechst, Puteaux, France

[21] Appl. No.: 463,194

[22] Filed: Jan. 10, 1990

[30] Foreign Application Priority Data

Jan. 10, 1989 [FR] France ................. 89 00214

[51] Int. Cl.$^5$ .............................. C08G 12/12
[52] U.S. Cl. .................... 528/245; 528/249; 528/252; 528/254; 528/256; 428/278; 428/290
[58] Field of Search ............... 528/245, 249, 252, 254, 528/256; 428/278, 290

[56] References Cited

U.S. PATENT DOCUMENTS

| | | | |
|---|---|---|---|
| 3,930,087 | 12/1975 | Petersen et al. | 428/278 |
| 4,198,462 | 4/1980 | Dixon | 428/290 |
| 4,220,751 | 9/1980 | Petersen et al. | 528/232 |
| 4,295,846 | 10/1981 | Petersen et al. | 8/186 |
| 4,345,063 | 8/1982 | North | 528/245 |
| 4,835,320 | 5/1989 | Blanc et al. | 568/465 |

FOREIGN PATENT DOCUMENTS

| | | |
|---|---|---|
| 0002793 | 7/1979 | European Pat. Off. . |
| 0120308 | 10/1984 | European Pat. Off. . |
| 0249530 | 12/1987 | European Pat. Off. . |
| 2616983 | 9/1977 | Fed. Rep. of Germany . |
| 2164919 | 8/1973 | France . |

OTHER PUBLICATIONS

Database WPI, Abrege No. 78810y, 1977, Derwent London, GB; "Resin Coating Cellulose Fibres–Using Reaction Prod. of Urea and Glyoxal Which is Heated After Coating", & JP-B-77 039958 (Dainippon Ink Chem K.K.), 07.10.1977.

*Primary Examiner*—Morton Foelak
*Assistant Examiner*—Sam A. Acquah
*Attorney, Agent, or Firm*—Browdy and Neimark

[57] ABSTRACT

Amino-plastic resins soluble in water of which the nitrogenous derivative is chosen from the group comprising urea, 1,3-dimethyl-urea, ethyleneurea, 4,5-dihydroxy-ethyleneurea or their mixtures and the aldehyde derivative is a mixture of from 1 to 99% by weight of glyoxal and from 99 to 1% by weight of glyoxal monoacetal of formula $(RO)_2CH-CHO$; $R=C_1-C_4$ alk, their ethers and their applications in particular with cellulosed fibre treatment.

14 Claims, No Drawings

AMINO-PLASTIC RESINS INTENDED FOR THE IMPROVEMENT OF CELLULOSED FIBRES AND THEIR APPLICATION

The present invention relates to new amino-plastic resins intended for the improvement of cellulosic fibres and their application.

The amino-plastic resins commonly used are the resins obtained by condensation between an aldehyde and an amine.

The amino-plastic resins soluble in water and prepared from a nitrogenous derivative which is a linear or cyclic urea such as urea, 1,3-dimethyl-urea, ethyleneurea, 4,5-dihydroxy-ethyleneurea and an aldehyde derivative which is formaldehyde, glyoxal, glyoxal monoacetal or a mixture of glyoxal and formaldehyde, are used in the improvement of cellulosic fibres.

Although these known amino-plastic resins offer interesting practical properties, for example, to confer crease resistance on cellulosed materials, they do not however totally respond to the demands of the market, either for economic reasons or because of the liberation of free formaldehyde at the time of their utilisation.

Now the Applicant has discovered new amino-plastic resins, soluble in water, intended in particular for the improvement of cellulosic fibres, obviating these inconveniences whilst offering good practical properties of crease-resistance.

The amino-plastic resins soluble in water according to the present invention are characterised in that the nitrogenous derivative is chosen from the group comprising urea, 1,3-dimethyl-urea, ethyleneurea, 4,5-dihydroxy-ethyleneurea or their mixtures, and that the aldehyde derivative is a mixture of 1 to 99% by weight of glyoxal and of 99 to 1% by weight of a glyoxal monoacetal of general formula (I), $(RO)_2 CH-CHO$, in which R represents a primary or secondary $C_1-C_4$ alkyl group, as well as their derivatives etherified with a $C_1-C_4$ alkanol.

By etherified derivatives, what is meant are the products of etherification of amino-plastic resins obtained by condensation between the nitrogenous derivative and the aldehyde derivative.

The expression primary or secondary $C_1-C_4$ alkyl group indicates a propyl, isopropyl, isobutyl or sec-butyl group and preferably an ethyl, n-butyl or methyl radical, in particular the latter.

The expression $C_1-C_4$ alkanol indicates ethanol, propanol, isopropylic alcohol, isobutylic alcohol or sec-butyl alcohol, and preferably methanol or butanol.

A more particular subject of the invention is the resins, as defined above, characterised in that the mol ratio of glyoxal monoacetal designated MA, to glyoxal designated G, MA/G is contained between 1.5 and 3.5. The preferred resins according to the invention are the resins in which the glyoxal monoacetal is dimethoxyethanal, hereafter designated DME. Advantageously, a subject of the present invention is the resins as defined above, characterised in that the mol ratio of the nitrogenous derivative, designated U, to glyoxal, U/G is contained between 1 and 2.7 and among these, those of which the nitrogenous derivative is uniquely ethyleneurea, designated EU, with a mol ratio EU/G contained between 1 and 2.7.

The glyoxal monoacetals of general formula (I) are known products and they can be obtained easily, for example, according to the process described in the European patent application No. 0,249,530.

The amino-plastic resins according to the present invention can be prepared by any appropriate and advantageous operating methods. Generally, the nitrogenous derivative or derivatives and the aldehyde derivatives chosen are reacted in aqueous solution, at a concentration by weight advantageously comprised between 30% and 70%, in a temperature range of between ambient temperature and the boiling point of the reaction medium, preferably between 40° and 70° C., at a pH of between 1.5 and 8, preferably between 3.5 and 7, until the quasi-total disappearance of the aldehyde derivatives employed, which requires, depending on the operating conditions, from 1 to 20 hours. The disappearance of the aldehyde derivatives in the reaction medium can be followed, if desired, by for example the analysis of samples taken regularly from this medium, such as by chemical quantitative analysis using Cannizzaro's reaction, or by quantitiative analysis by chromatography in the liquid phase at high performances. In the case where it is desired to obtain an etherified resin with a $C_1-C_4$ alkanol, the condensation product of the chosen nitrogenous derivative or derivatives with the mixture of aldehyde derivatives is made to react, preferably at a pH of between 1 and 5 and at a temperature of between ambient temperature and the boiling temperature of the reaction medium, with an excess of selected $C_1-C_4$ alkanol, the excess alkanol of which is eliminated by intrinsically known means.

The resins according to the present invention present interesting practical properties in the improvement of cellulosed fibres, in particular to give them crease-resistance. They are suitable for cellulosic materials, woven or non-woven, containing 100% of cellulosic product such as for example, cotton, rayon and linen, as well as for mixtures, for example, polyester-cotton or polyester-rayon. Such mixtures contain preferably, but not obligatorily, at least 20% cellulose. Whites as well as colours (printed, dyed, dyed at the thread level, cross-dyed and similar) can be treated effectively with the resins according to the invention. Substances containing free hydroxyl group fibres can equally be treated.

The application of resins according to the invention to the substance to be treated generally takes place in the presence of an appropriate catalyst. Particularly suitable are acids such as hydrochloric, sulphuric, fluoroboric, acetic, glycolic, maleic, lactic, citric, tartaric and oxalic; metal salts such as magnesium or zinc chloride, nitrate, fluoroborate or fluorosilicate, ammonium chloride, zirconium oxychloride, sodium or potassium bisulphate, sodium or potassium phosphite or hydrophosphite; amine chlorhydrates, such as 2-amino-2-methyl-propanol chlorhydrate and similar products as well as their mixtures.

The quantity of catalyst employed in general represents between 0.01 and 10%, preferably between 0.05 and 5% of the weight of the impregnating bath.

The resins according to the invention can be applied to textile materials by all known and appropriate processes, for example by immersion or impregnation, in general using an aqueous solution or an alcoholic solution. The solvent can therefore be water, an aliphatic alcohol such as methanol, ethanol or isopropanol, or a mixture of water and aliphatic alcohol. Standard additives, in appropriate quantities, can be incorporated in these treatment baths, such as, lubricants, plasticisers, agents giving body, water resistant products, flame retardants, anti-soiling agents, fungal growth inhibitors, anti moisture soiling agents, fluorescent colouring agents and similar. However, these auxiliary products must not interfere with the correct operation of the resin according to the invention, they must not themselves exercise a harmful effect on the material to be treated and it is desirable that they are free from formaldehyde.

The quantity of resin to be applied on the textile substance depends on the nature of that substance and the desired result. Generally, it is of the order of 0.5 to 10%, preferably between 2 and 5%, with reference to the weight of the textile.

During the process of treating textiles with the resins according to the invention, the textile is impregnated with an aqueous or alcoholic solution of the resin according to the invention, then the textile thus impregnated is dried and the resin is polymerised. The drying and polymerising stages can be consecutive or simultaneous. Possibly, the textile substance can be finished with post-polymerisation (also called deferred or retardation polymerisation). This process consists of impregnating the textile with a solution of resin according to the invention and a catalyst, of careful drying the impregnated substance in a fashion so that the resin does not react, then after an prolonged interval, of heating the substance to a temperature at which the resin polymerises under the influence of the catalyst.

The following examples are given as illustrations; they allow a better understanding of the invention but do not limit its scope. Except for indications to the contrary, the parts and percentages are given by weight.

EXAMPLE 1

Preparation of a glyoxal-dimethoxy-ethanal mixture.

829 g of an aqueous solution of glyoxal at approximately 70% by weight, that is 10 moles, is dissolved by gentle heating in 3,204 g (100 moles) of methanol then this solution acidified with 129 g of sulphuric acid at 96%, that is 1.26 mole, is heated under reflux. The acetalisation reaction is followed by the determination of the non-transformed glyoxal using Cannizzaro's reaction on a sample taken regularly from the reaction medium. When 80% of the glyoxal inserted has been consumed, the reaction medium is cooled down to ambient temperature, then, at this temperature, it is neutralised to approximately pH=6.8 with approximately 230 g (2.74 moles) of sodium hydrogen carbonate and then the insoluble mineral salts are eliminated by filtration and the non-transformed methanol is eliminated by vacuum distillation.

The residual oil obtained is taken up with approximately 0.7 volume of water, that is 1,500 g, then the aqueous solution obtained is concentrated under vacuum (200 mbar) up to the quasi-total elimination of non-transformed methanol.

Thus 1800 g of an aqueous solution is obtained containing by weight approximately:
43.5% of dimethoxyethanal, that is 7.53 moles,
2% of 1,1,2,2-tetramethoxy-ethane, that is 0.24 mole,
6.9% of glyoxal, that is 2.14 moles,
1.3% of methanol,
45% of water.

The glyoxal was analysed by Cannizzaro's standard method and the other titers were determined by gas chromatography on a chromatograph equipped with a column of 3 m length and 3.17 mm diameter filled with Chromosorb 101, at an initial pressure of 165 kPa and at an initial temperature of 110° C. The final temperature was 275° C. with an ascending temperature gradient of 10° C./minute. The internal etalon used was acetonitrile (retention time 7 min) and the retention times of dimethoxyethanal and 1,1,2,2-tetramethoxy-ethane were 14 minutes and 19 minutes respectively.

EXAMPLES 2-4

Preparation of textile resins x mole of a urea A and y mole of a urea B are introduced into 240 g of a crude aqueous solution of dimethoxyethanal prepared according to example 1, containing approximately 1 mole of dimethoxyethanal and 285 moles of glyoxal, then the pH of the reaction medium is adjusted to the value H.

The reaction medium is then heated to 60° C.±5° C., until the proportion of free glyoxal and free dimethoxyethanal is less than 2% by weight, which requires approximately 2 hours of heating. The reaction medium is then cooled down to ambient temperature.

The amino-plastic resins according to the invention are thus obtained, the preparation parameters of which are given in table 1 and the practical properties of which are given in table II.

TABLE I

| Example | x | A | Y | B | H | U/G |
|---|---|---|---|---|---|---|
| 2 | 0.285 | urea | 0.215 | ethyleneurea | 6.5 | 1.75 |
| 3 | 0.5 | urea | 0 | | 6 | 1.75 |
| 4 | 0.285 | 1,3dimethyl urea | 0.5 | ethyleneurea | 5.8 | 1.75 |

EXAMPLE 5

A solution S is prepared by mixing, with agitation at ambient temperature:
46 g of an aqueous solution of glyoxal at approximately 70% by weight, that being 0.555 mole,
134 g of a dimethoxyethanal solution at approximately 78% by weight, that being 1 mole,
91 g (1.06 mole) of ethyleneurea.

This solution is then taken to pH=3.5 then it is heated to 60° C. until the proportion of free glyoxal is less than 2% by weight, this requires two hours. Thus 271 g of resin according to the invention is obtained, the practical properties of which are given in table II.

EXAMPLE 6

A solution S is prepared according to example 5, then this solution is brought to pH=6.8. It is then heated until the proportion by weight of free glyoxal is less than 2%, which requires approximately 2 hours. Thus 271 g of resin is obtained the practical properties of which are given in table II.

EXAMPLE 7

A 100% cotton poplin material, scalded and bleached, with a weight of approximately 130 g per square meter, with a squeeze-out ratio of 75%, is impregnated by a padding machine in an aqueous bath containing in solution:
sufficient quantity of resin according to the invention, in a manner so as to obtain a combined nitrogen ratio of 9.14 g per liter,
12 g per liter of hexahydrated magnesium chloride, 2.1 g per liter of acetic acid, 2 g per liter of ethoxylated nonylphenol with 10 moles of ethylene oxide.

The material is then dried at 120° C. then it is subjected to a thermal treatment for 1 minute at 140° C., on a laboratory stenter.

Then, using samples of treated material, the following is determined:

the crease recovery according to the AATCC no. 66-1973 method on samples as they are and on samples subjected to three domestic washings at 60° C.: the crease recovery is expressed as the sum of the crease recovery angles obtained in the direction of the warp and in the direction of the weft;

the resistance to traction Rt, expressed in daN, in the direction of the warp and in the direction of the weft, according to the AFNOR G 07 001 standard.

The results are given in table II.

TABLE II

|  | | Crease recovery angles on the material | | |
|---|---|---|---|---|
|  | | as is | after 3 washes | Rt |
|  | on non-treated material | 191 | 172 | 93.6 |
| 2 | on material treated with the resin described in example 2 | 252 | 230 | 66 |
| 3 | on material treated with the resin described in example 3 | 224 | 186 | 70 |
| 4 | on material treated with the resin described in example 4 | 238 | 222 | 69 |
| 5 | on material treated with the resin described in example 5 | 213 | 203 | 75.5 |
| 6 | on material treated with the resin described in example 6 | 244 | 212 | 70.2 |

It is noted that the resins of the present invention considerably improve the crease resistant qualities of treated materials even after washing without however lowering their resistance too much.

We claim:

1. Amino-plastic resins free of formaldehyde and soluble in water, characterised in that the nitrogenous derivative is chosen from the group comprising urea, 1,3-dimethyl-urea, ethyleneurea, 4,5-dihydroxy-ethyleneurea or their mixtures and in that the aldehyde derivative is a mixture of from 1 to 99% by weight of glyoxal and of from 99 to 1% by weight of glyoxal monoacetal of general formula (I), $$(RO)_2CH-CHO \tag{I}$$

in which R represents a primary or secondary $C_1$–$C_4$ alkyl group, as well as, if desired, their etherified derivatives with $C_1$–$C_4$ alkanol.

2. Resins according to claim 1, characterised in that the mol ratio of glyoxal monoacetal to glyoxal is contained between 1.5 and 3.5.

3. Resins according to claim 1 characterised in that the glyoxal monoacetal is dimethoxyethanal.

4. Resins according to claim 1 characterised in that the mol ratio of the nitrogenous derivative to the glyoxal is contained between 1 an 2.7.

5. Resins according to claim 4, characterised in that the nitrogenous derivative is ethyleneurea.

6. Application as improvement products for cellulosed fibres, of resins as defined in claim 1.

7. Application as improvement products for cellulosed fibres, of resins as defined in claim 2.

8. Application as improvement products for cellulosed fibres, of resins as defined in claim 3.

9. Application as improvement products for cellulosed fibres, of resins as defined in claim 4.

10. An amino-plastic resin suitable for finishing cellulosic textiles, consisting essentially of a reaction product of a nitrogenous compound selected from the group consisting of urea, 1,3-dimethyl-urea, ethyleneurea, 4,5-dihydroxy-ethyleneurea and mixtures thereof, and a mixture of glyoxal and a glyoxal monoacetal of the formula $$(RO)_2CH-CHO \tag{I}$$

wherein R is a primary or secondary $C_1$–$C_4$ alkyl group, or an etherified derivative thereof with $C_1$–$C_4$ alkanol, the mole ratio of said nitrogenous compound to glyoxal being in the range of 1–2.7.

11. A resin according to claim 10 wherein the mole ratio of said glyoxal monoacetal to said glyoxal is 1.5–3.5.

12. A resin according to claim 11 wherein said glyoxal monoacetal is dimethoxyethanal.

13. A resin according to claim 12 wherein said nitrogenous compound is ethyleneurea.

14. In a method for the treatment of cellulosic fibers with an amino-plastic resin, the improvement wherein said resin is a resin according to claim 10.

* * * * *